(12) United States Patent
Morisaki et al.

(10) Patent No.: US 8,853,896 B2
(45) Date of Patent: Oct. 7, 2014

(54) ROTATING ELECTRICAL MACHINE

(71) Applicants: Yoshio Morisaki, Mie (JP); Sueyoshi Mizuno, Tokyo (JP); Shinichi Noda, Tokyo (JP)

(72) Inventors: Yoshio Morisaki, Mie (JP); Sueyoshi Mizuno, Tokyo (JP); Shinichi Noda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/646,349

(22) Filed: Oct. 5, 2012

(65) Prior Publication Data
US 2013/0026866 A1 Jan. 31, 2013

Related U.S. Application Data

(63) Continuation of application No. PCT/JP2011/058608, filed on Apr. 5, 2011.

(30) Foreign Application Priority Data

Apr. 6, 2010 (JP) ................................. 2010-087736

(51) Int. Cl.
*H02K 5/24* (2006.01)
*H02K 9/14* (2006.01)
*H02K 11/00* (2006.01)
*H02K 5/08* (2006.01)

(52) U.S. Cl.
CPC .. *H02K 5/24* (2013.01); *H02K 9/14* (2013.01); *H02K 11/0073* (2013.01); *H02K 5/08* (2013.01)
USPC ................................. 310/51; 310/89

(58) Field of Classification Search
CPC ............. H02K 5/24; H02K 7/04; H02K 7/09; G11B 19/2018

USPC ................. 310/51, 87–89; 181/224, 230, 292
See application file for complete search history.

(56) References Cited

U.S. PATENT DOCUMENTS

| 3,821,999 | A | * | 7/1974 | Guess et al. | 181/296 |
|---|---|---|---|---|---|
| 4,421,455 | A | * | 12/1983 | Tomren | 415/119 |
| 4,560,028 | A | * | 12/1985 | Perret | 181/288 |
| 6,274,216 | B1 | * | 8/2001 | Gonidec et al. | 428/116 |
| 6,371,242 | B1 | * | 4/2002 | Wilson et al. | 181/292 |
| 2006/0060421 | A1 | * | 3/2006 | Sarin et al. | 181/290 |

FOREIGN PATENT DOCUMENTS

| JP | 2007-315270 | | 12/2007 |
|---|---|---|---|
| JP | 2008128142 A | | 6/2008 |
| JP | 2008-163767 | | 7/2008 |
| JP | 2008163767 A | * | 7/2008 |
| JP | 2010-031582 | | 2/2010 |

OTHER PUBLICATIONS

JPO website English translation of JP 2008163767, Taniguchi et al., Electrically-driven compressor for e.g. hybrid vehicle, has insulation cover that suppresses internal and external heat transfer in inverter case, Jul. 2008, all pages.*

(Continued)

*Primary Examiner* — Quyen Leung
*Assistant Examiner* — Naishadh Desai
(74) *Attorney, Agent, or Firm* — Baker Botts L.L.P.

(57) ABSTRACT

A rotating electrical machine includes a stator and a rotor both accommodate in a frame, on which is mounted a control case to house a drive unit including an inverter. In the machine, the control case has a vibration suppression structure that suppresses vibration of the control case. The vibration suppression structure includes honeycombed ribs formed integrally with a wall surface of the control case.

16 Claims, 8 Drawing Sheets

(56) References Cited

OTHER PUBLICATIONS

Notification of Reasons for Refusal issued in related JP Patent Application No. 2010-087736, mailed Aug. 10, 2013, 5 pages.

Office Action issued in related Chinese Patent Application No. 201180017815.5 mailed Jun. 12, 2014, 12 pages (with translation.).
Office Action issued in related Japanese Patent Application No. 2010-087736 mailed Apr. 8, 2014, 7 pages.

* cited by examiner

ROTATING ELECTRICAL MACHINE

CROSS-REFERENCE TO RELATED APPLICATIONS

This application is based upon and claims the benefit of priority from the prior Japanese Patent Application No. 2010-87736 filed on Apr. 6, 2010 and International Application No. PCT/JP2011/058608 filed on Apr. 5, 2011, the entire contents of both of which are incorporated herein by reference.

FIELD

Embodiments described herein relate to a rotating electrical machine having a stator and a rotor both mounted in a frame.

BACKGROUND

FIGS. 8A and 8B schematically illustrate two major arrangement forms of a drive unit in the rotating electrical machine of the above-described type. More specifically, FIG. 8A shows a control case 1 which houses a drive unit such as an inverter and is separated from a rotating electrical machine 2. An output voltage of the inverter is supplied to the machine 2 via a power supply cable 3 drawn out of the control case 1. This arrangement form necessitates an installation space for the control case 1 aside from one for the machine 2, resulting in a problem of low space efficiency. This arrangement form also has a problem that surge voltage results from reflection of radio waves between the machine 2 and the power supply cable 3 or the like and a problem that radio waves emitted from the power supply cable 3 influences other equipment as noise.

On the other hand, FIG. 8B shows a control case 1' fixed to an outer periphery of a frame 2a' of a rotating electrical machine 2' in the other arrangement form. This arrangement form can achieve a reduction in the installation space while rendering the power supply cable 3 and the like unnecessary, whereupon the aforementioned problem of noise and the like can be overcome.

However, even in a case where an elastic material such as rubber is interposed between the frame 2a' and the control case 1' in the latter rotating electrical machine 2', the control case 1' resonates with the frame 2a' as the result of vibration transmission from the frame 2a' and resultant resonance is produced from the control case 1'. Furthermore, the control case 1' houses a known switching circuit including electronic components constituting the inverter, a substrate for the mounting of the electronic components and the like. Accordingly, the control case 1' is rendered relatively larger in size and noise resulting from vibration is also increased, with the result that the electronic components are required to be protected from vibration.

The control case 1' as shown in FIG. 8B is directed to a rotating electrical machine including a stator frame which is provided with a mass in order that vibration and noise both produced by the rotating electrical machine may be suppressed. However, such a countermeasure is not suggested for the control case 1'. Furthermore, the electronic components of the inverter need to be protected from vibration and accordingly, there is a problem to be overcome when the control case 1' is attached to the machine 2'.

DETAILED DESCRIPTION

Figure 1:
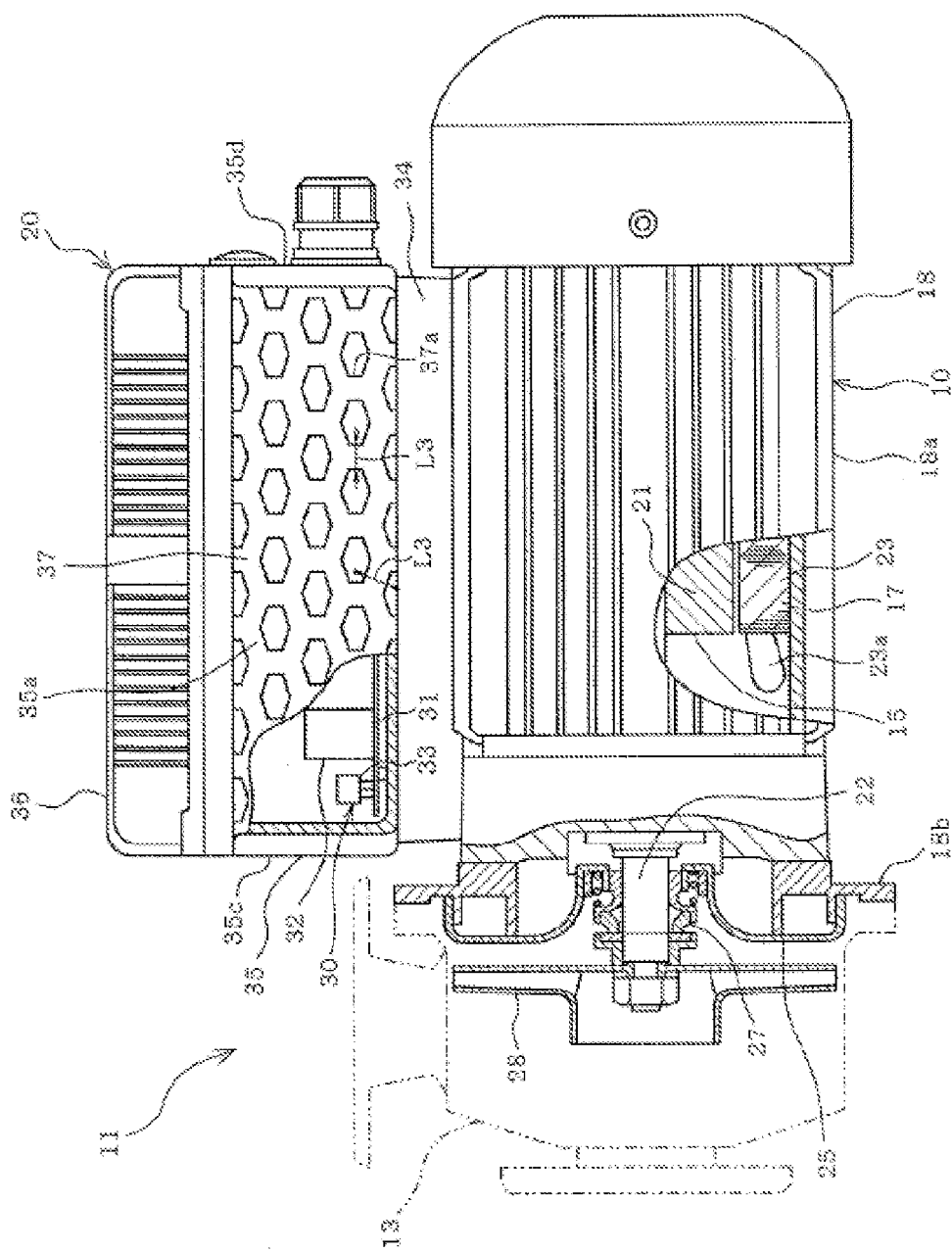
FIG. 1 is a partially broken side view of a rotating electrical machine to which a control case is attached, according to one embodiment, the machine being applied to a pump.

In general, according to embodiments, a rotating electrical machine has a stator and a rotor both accommodated in a frame, on which is mounted a control case to house a drive unit including an inverter. In the machine, the control case is provided with a vibration suppression structure that suppresses vibration of the control case wherein the vibration suppression structure comprises honeycombed ribs formed integrally with a wall surface of the control case.

One embodiment of the rotating electrical machine which will be referred to as "electric motor 10" will be described with reference to FIGS. 1 to 7B. In the embodiment, the rotating electrical machine is an electric motor 10 applied to a pump unit.

The pump unit includes the motor 10 and is configured to be connectable to various types of pump casings 13 according to an intended use of the motor 10 (in more detail, "an integrated rotating body" as will be described later). More specifically, FIG. 1 exemplifies a pump casing 13 dedicated to a stainless centrifugal pump. Other types of pump casings include those for single absorbing centrifugal pumps, line pumps and stainless line pumps although none of them are shown. These types of pump casings are connectable to the integrated rotating body.

The motor 10 includes a rotor 15, a stator 17 which is disposed around an outer periphery of the rotor 15 so as to be opposed to the rotor 15, a motor frame 18 accommodating the rotor 15 and the stator 17, and a control case 20 mounted on the frame 18. The rotor 15 includes a rotor core 21 formed of laminated steel sheets into a substantially cylindrical shape and permanent magnets (not shown) for the forming of magnetic poles, embedded in an outer periphery of the rotor core 21. A plurality of, for example, four permanent magnets are provided so as to axially extend in the outer periphery of the rotor core 21 thereby to compose the rotor 15 of the four pole structure. The stator 17 includes an annular stator core 23 formed of laminated steel sheets and stator windings 23a wound in slots of the stator core 23 and fixed to an inner periphery of the motor frame 18.

The motor frame 18 constitutes an outer wall of the motor 10 and includes a cylindrical portion 18a having an end side (a left side in FIG. 1) provided with a thin flat plate-shaped frame cover 25 which closes an opening at the end side. The frame cover 25 has a central part formed with a hole (not shown) through which a rotating shaft 22 extends and a mechanical seal 27 serving as shaft sealing. The cylindrical portion 18a has two ends provided with bearing brackets having bearings respectively. The rotating shaft 22 is rotatably supported on the paired bearings. The motor frame 18 may only be provided with a bearing on at least one end thereof to bear the rotating shaft 22. The motor and the pump may be separated by the bearing bracket, instead of the frame cover 25.

The rotating shaft 22 has a distal end (a left end in FIG. 1) to which an impeller or bladed wheel 28 is mounted. The pump casing 13 is connected via the flange 18*b* to one end side of the cylindrical portion 18*a* of the motor frame 18 so as to surround the impeller 28, whereby the stainless centrifugal pump is constructed. Furthermore, one of the aforementioned pump casings for single absorbing centrifugal pumps, line pumps and stainless line pumps is selectively connected to the motor 10 according to an intended purpose thereof, whereby the single absorbing centrifugal pump, line pump or stainless line pump is constructed.

Thus, in the pump unit 11, the integrated rotating body is constituted by the motor 10 and major components (the frame cover 25, the mechanical seal 27, the impeller 28 and the like) provided for the motor 10 and used in common with various types of pump casings. Accordingly, when the aforementioned types of dedicated pump casings are connected to the integrated rotating body, various types of pump units can be constructed which have respective diameters ranging from φ25 to φ50 and output powers ranging from 0.05 kW to 3.7 kW. Furthermore, since the motor 10 is constructed into an interior permanent magnet (IPM) motor, a high efficient and high energy saving motor can be provided.

The control case (terminal box) 20 and the inverter 30 housed in the control case 20 will now be described. Firstly, the inverter 30 includes a direct current (DC) power supply circuit, a switching circuit which switches DC power from the DC power supply circuit and a control circuit which on-off controls switching elements of the switching circuit, as well known in the art. These circuits include a capacitor 32 and switching elements 33 such as insulated gate bipolar transistors (IGBTs) both provided on a control circuit substrate 31 as shown in FIG. 1. Furthermore, the inverter 30 has a connection terminal that is connected via a cable (not shown) to an alternating current (AC) power supply. Thus, the inverter 30 is configured as a drive device controlling the motor 10. Additionally, the control case 20 may be provided with a controller substrate separate from the control circuit substrate 31 although the controller substrate is not shown. An input unit for setting a rotational speed of the motor 10 may be provided on the controller substrate so as to be externally operable.

Figure 2:
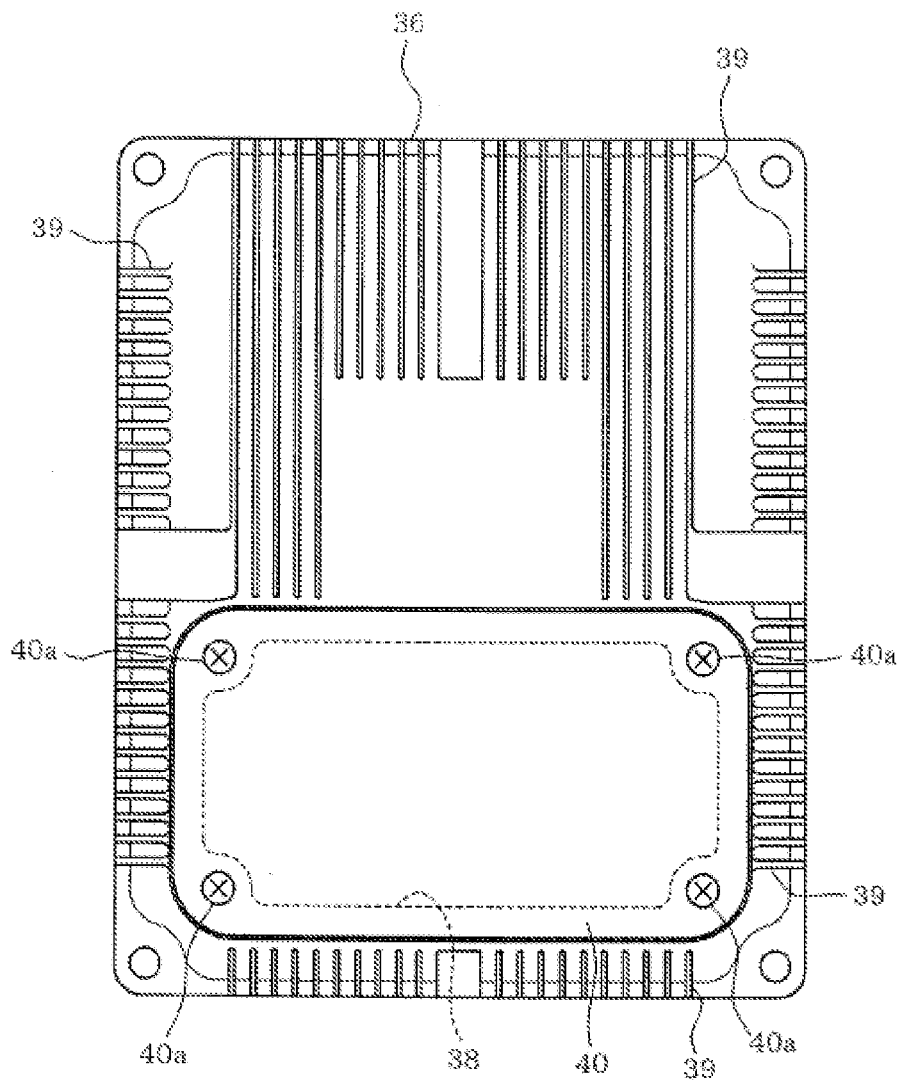
FIG. 2 is a plan view of the control case.
Figure 3:
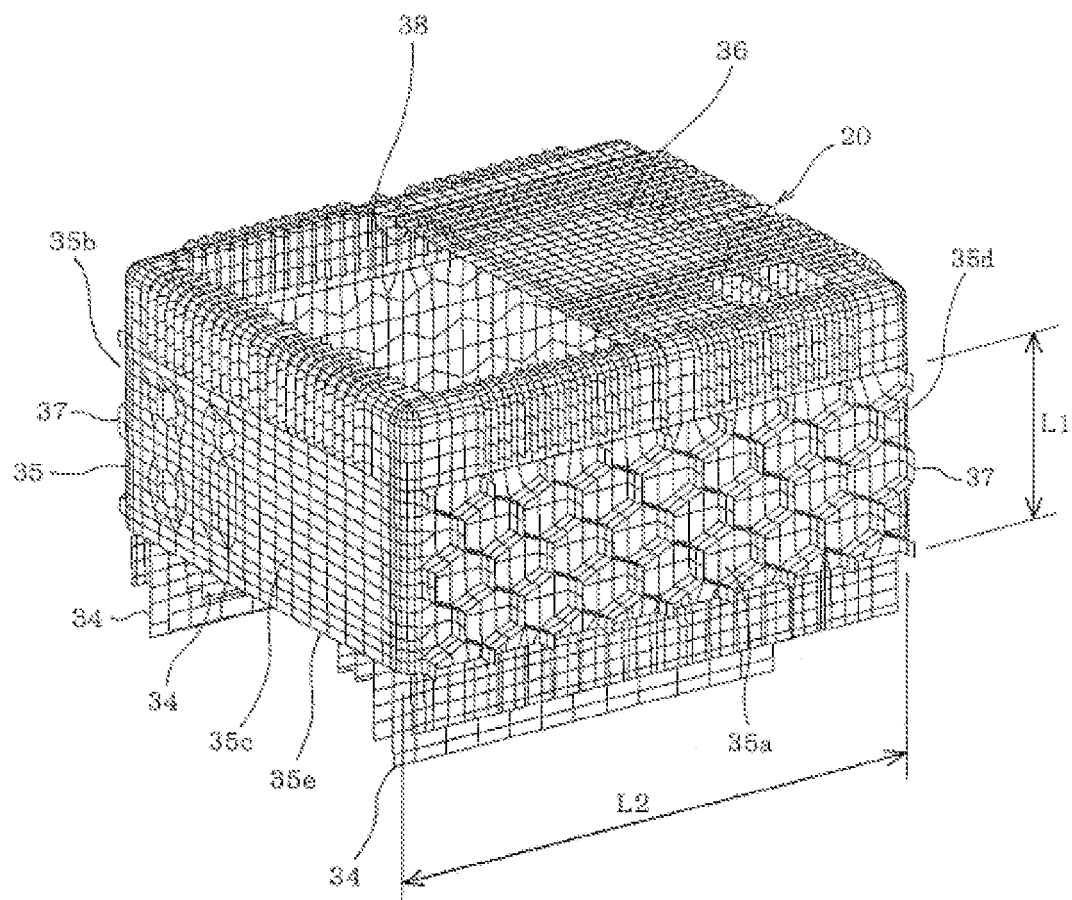
FIG. 3 shows an analytical model of the control case.

The control case 20 includes a case body 35 having an open side and a case cover 36 that is provided so as to cover the open side and is formed into the shape of a generally rectangular box, as shown in FIGS. 1 to 3. The case body 35 and the case cover 36 are castings from a metallic material such as aluminum alloy. The material of the case body 35 and the case cover 36 may include a synthetic resin or another material inclusive of non-metallic material.

The case body 35 has a peripheral wall including four sides (side walls) 35*a* to 35*d* and a bottom 35*e* (the bottom at the mounting side) opposed to the open side. The case body 35 is mounted at the bottom 35*e* side to a radial outside (an upper side, for example) of the cylindrical portion 18*a* of the motor frame 18. The bottom 35*e* of the case body 35 has a plurality of cooling fins 34 for heat radiation, formed integrally therewith. The fins 34 extend in the lengthwise direction of the bottom 35*e* as exemplified in FIG. 3. The cooling fins 34 protrude to the motor frame 18 side and have respective dimensions of protrusion each of which is larger at outside (sides 35*a* and 35*b*) than at the central side such that the cooling fins 34 are formed so as to extend along an outer shape of the cylindrical portion 18*a*. Consequently, a surface area in contact with external air can be increased in the bottom 35*e* of the case body 35, whereby the cooling efficiency can be improved. The case body 35 is rectangular in a planar view and includes two sides 35*a* and 35*b* which face each other and have respective larger areas. Honeycomb ribs 37 are provided on only the sides 35*a* and 35*b*.

In more detail, the honeycomb ribs 37 are formed over entire surfaces of the sides 35*a* and 35*b* by the aforesaid die-casting, respectively. Each of the sides 35*a* and 35*b* has lengthwise and crosswise dimensions of 70 mm×255 mm (lengthwise dimension L1×crosswise dimension L2 in FIG. 3) and has a thickness of 5 mm. On the other hand, each honeycomb rib 37 has a height or a dimension of protrusion from each one of the sides 35*a* and 35*b*, set to 10 mm and a thickness L3 set to 10 mm. Accordingly, the height and the thickness of each honeycomb rib 37 are set so as to be approximately 5% smaller or larger than the lengthwise dimension L2 of each one of sides 35*a* and 35*b* of control case 20. Each of the sides 35*a* and 35*b* has hexagonal holes 37*a* each of which has a depth of 10 mm and which are arranged into zigzag alignment at predetermined intervals.

The case cover 36 is formed into a generally rectangular lid shape and covers the open side of the case body 35. The case cover 36 has an opening 38 facing the aforesaid connecting terminal in the control case 20. The case cover 36 has a plurality of cooling (heat-radiating) fins 39 formed integrally therewith. A closing plate 40 serving as a closure closing the opening 38 is mounted to the case cover 36 by a screw 40*a*. The closing plate 40 is formed of a material (stainless steel, for example) differing from a material of the case cover 36 and has the shape of a rectangular thin plate.

Figure 5B:
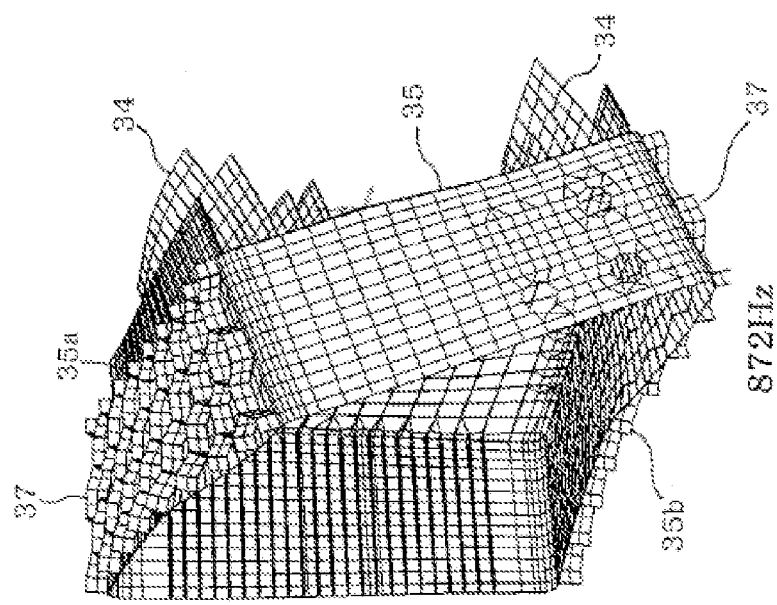
FIGS. 5A and 5B are exaggerated views of vibration modes by an eigenvalue analysis when the case cover is attached to or detached from the control case respectively.
Figure 5A:
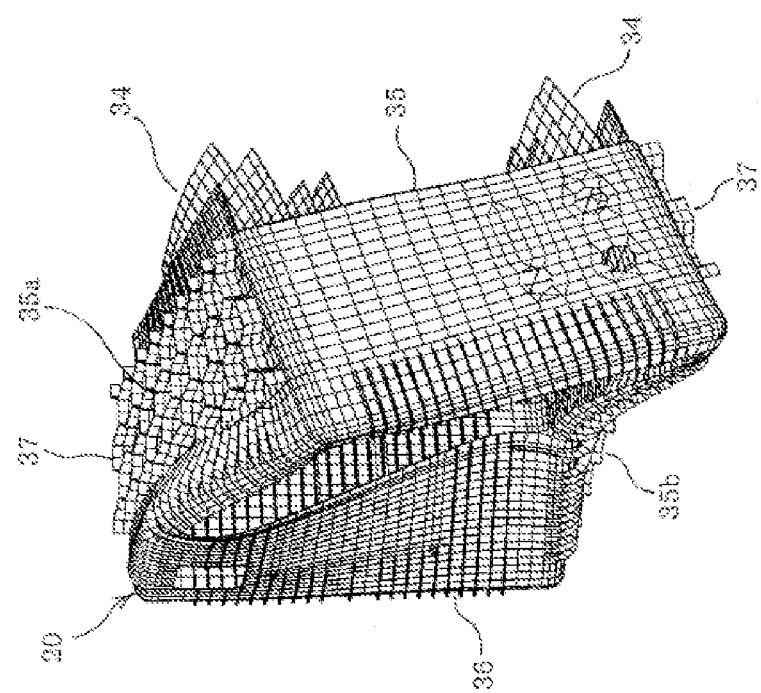
Figure 6:
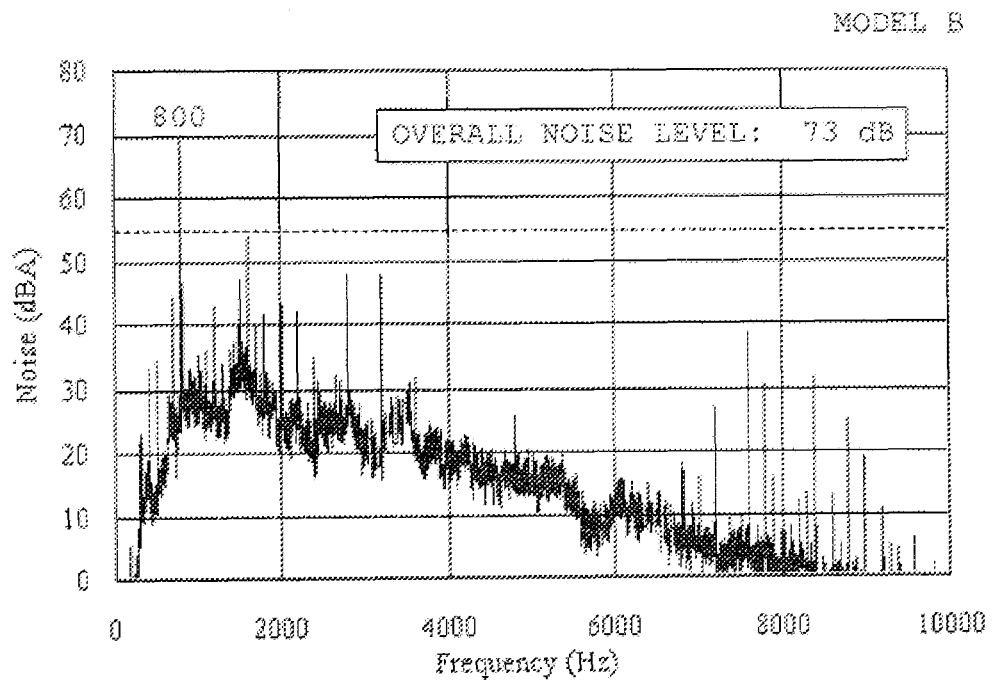
FIG. 6 is a graph similar to FIG. 4, showing a control case with a conventional configuration.

The following will describe noise levels and vibration characteristics of the control case 20 (model A) having the above-described construction and the control case 1' (model B) having a conventional construction with reference to FIGS. 4 to 7B. Firstly, FIG. 6 shows a result of analysis of noise frequency in the case where the conventional control case 1' of model B was mounted to the motor 10, which was then rotated at 200 Hz. In this case, an overall noise level is at 73 dB which value is relatively larger, and a maximum noise level is reached at the frequency of 800 Hz. Since the motor 10 has four poles in the embodiment, a rated speed thereof is at 6,000 rpm.

Figure 7A:
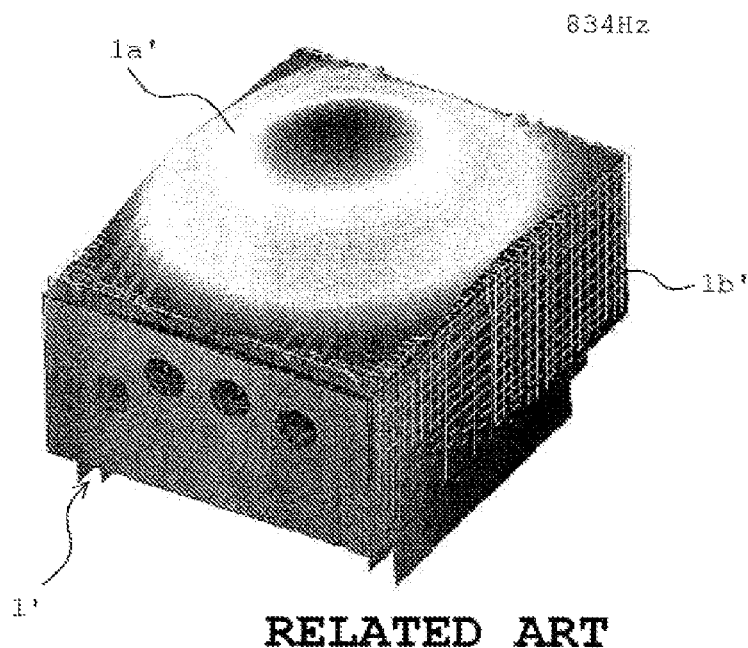
FIGS. 7A and 7B are views of vibration modes by an eigenvalue analysis when the case cover of the conventional configuration is attached to or detached from the control case respectively.
Figure 7B:
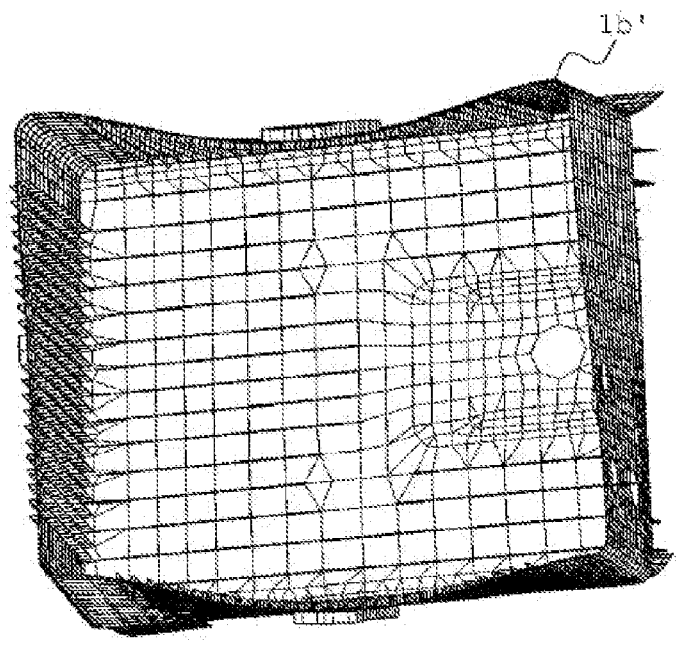
Figure 8A:
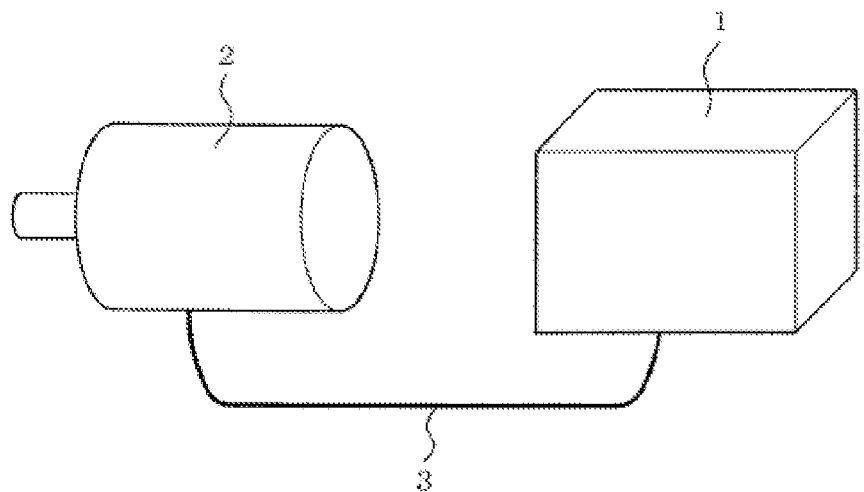
FIGS. 8A and 8B are schematic views showing a major arrangement form of the control case and another arrangement form of the control case in the conventional rotating electrical machine respectively.
Figure 8B:
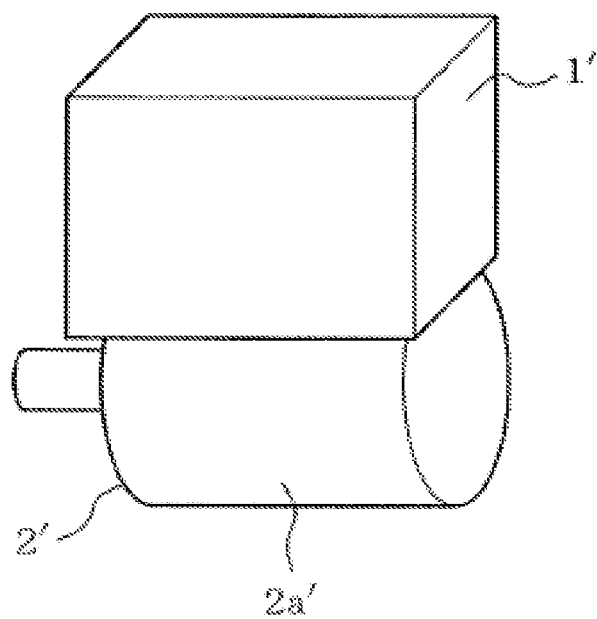

FIGS. 7A and 7B show vibration modes in the cases where the case cover 1*a'* was mounted to and detached from the control case 1' of model B respectively. The natural frequency analysis of a finite element model shows that the case cover 1*a'* has a natural frequency of 834 Hz and the case body 1*b'* has a natural frequency of 792 Hz. Furthermore, FIGS. 7A and 7B show portions of large displacement (anti-nodes) on a central upper surface of the case cover 1*a'* and two sides of the case body 1*b'* having larger areas, respectively. The reason for the forming of the large displacement portions is considered as follows. The case cover 1*a'* and the case body 1*b'* have respective natural frequencies having values which are approximately four times larger (800 Hz) than a rotational frequency (200 Hz) of the motor 10. Accordingly, the control case 1' resonates with the motor 10 and in particular, vibrations are increased in the upper surface of the case cover 1*a'* and the sides of the case body 1*b'*, and the resultant resonance is produced. As a result, it is considered that noise is increased.

Figure 4:
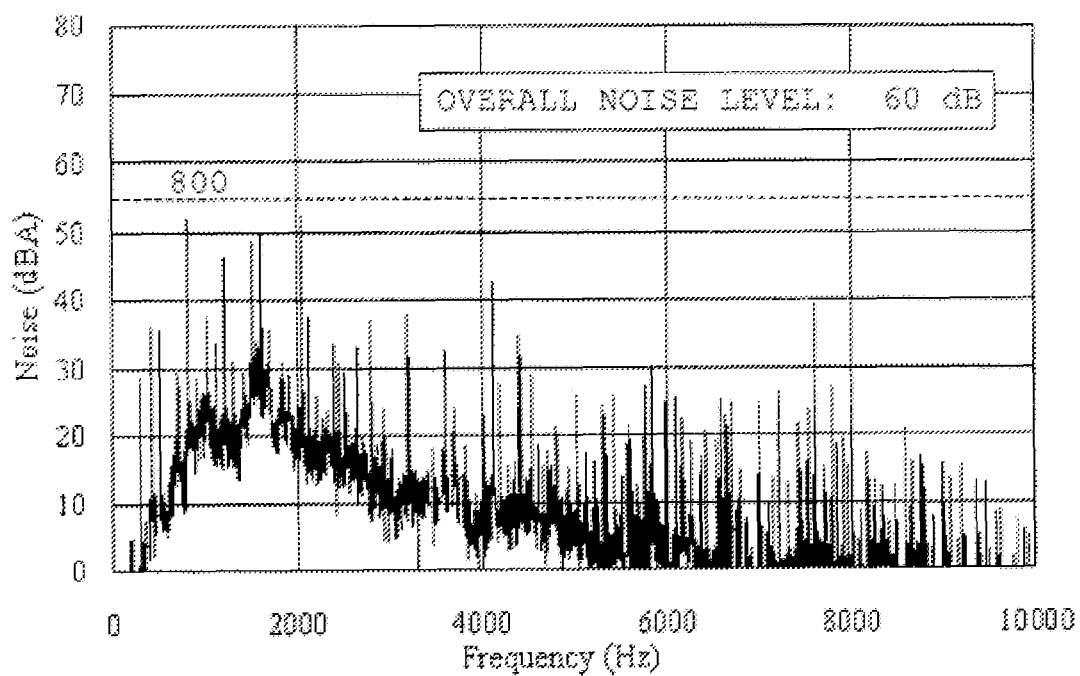
FIG. 4 is a graph showing noise level in the control case.

On the other hand, FIG. 4 shows a result of analysis of noise frequency in the case where the control case 20 of model A was mounted to the motor 10, which was then rotated at 200 Hz in the same manner as described above. In this case, an overall noise level is at 60 dB which value indicates that a clear noise reduction effect is obtained as compared with 73 dB in the conventional model B. Furthermore, FIG. 4 shows that noise is reduced so as to be lower than a predetermined target value (as shown by broken line in FIG. 4) in the overall frequency range and in particular, noise is reduced at the frequency of 800 Hz.

FIGS. 5A and 5B show vibration modes in the cases where the case cover 36 was mounted to and detached from the control case 20 of model A respectively. For convenience of explanation, the natural vibration modes are exaggerated in FIGS. 5A and 5B. The natural frequency analysis of a finite element model shows that the case cover 20 has a natural frequency of 872 Hz. More specifically, the honeycomb ribs 37 and the closing plate 40 are formed into the vibration suppression structure in the control case 20, and the control case 20 is configured so that the natural frequency of the control case 20 is detuned so that the control case 20 can be prevented from resonating with the motor 10. In the embodiment, the natural frequency of the control case 20 is increased approximately 10% (72 Hz in the above-described analysis) of a quadruple value (800 Hz) of the rotational frequency of the motor 10 by the honeycomb ribs 37 and the closing plate 40, whereupon the control case 20 can be prevented from resonating with the motor 10 with the result of a large reduction in the noise.

Furthermore, the inventors conducted the above-described natural frequency analysis with respect to various types of control cases (not shown) having different shapes of ribs. Consequently, the honeycomb structure with the above-described dimensions and shape can improve the stiffness of the control case 20 and suppress noise and vibration while suppressing increases in the height and thickness of the ribs thereby to render the control case 20 as compact as possible.

Accordingly, the control case 20 configured as described above can be prevented from resonating with the motor 10 even when the motor 10 is started and a rotational speed is increased to a rated speed thereof or decreased from the rated speed thereof. The control case 20 can render the vibration smaller and reduce noise to a large degree while having a structure suppressing size increase. Furthermore, even when the switching element 33 of the inverter generates heat, the heat can be radiated outside via the cooling fins 34 and 39 constituting the outer surface of the control case 20, whereupon deterioration of electronic components due to heat can be suppressed. Still furthermore, the honeycomb ribs 37 can also increase a surface area of the control case 20 to contact with outside air, thereby improving the cooling effect.

The control case housing a drive device such as the inverter 30 is mounted on the frame 18 of the motor 10 as described above. The control case 20 is provided with the vibration suppression structure which suppresses vibration of the control case 20 or adjusts the natural frequency of the control case 20. Accordingly, the vibration of the control case 20 can be suppressed by the vibration suppression structure or the control case 20 can be prevented from resonating with the motor 10. Consequently, noise can be suppressed during operation of the motor 10, whereby the electronic components of the inverter 30 can be protected from the vibration. Furthermore, since the vibration suppression structure is provided in the control case 20 to suppress vibration and noise, an elastic member such as rubber need not be provided between the motor 10 and the control case 20, whereby the construction of the control case 20 can be simplified.

The vibration suppression structure includes the honeycomb ribs 37 formed integrally with the control case 20. Accordingly, the vibration (noise) suppression effect in the control case 20 can be improved as much as possible while the control case 20 can be rendered as compact as possible with the height and thickness of the ribs 37 being suppressed. Furthermore, since the ribs 37 are easily formed by die forming, the vibration suppression structure can be rendered more cost-effective and simpler. Although the aforementioned elastic material such as rubber cannot avoid aged deterioration, the provision of the above-described ribs 37 can eliminate the elastic material. Consequently, the effect of suppressing vibration and noise can be maintained longer.

The ribs 37 are formed on only the sides 35a and 35b of the control case 20, and the cooling fins 34 and 39 are provided on the sides 35e and 36 other than the sides 35a and 35b of the control case 20. Accordingly, the effect of suppressing both vibration and noise can be achieved by the ribs 37 in the control case 20, and a cooling effect can be achieved by the fins 34 and 39, whereupon the control case 20 can be rendered suitable for housing the inverter 30.

The ribs 37 are formed so as to detune the natural frequency of the control case 20 so that the control case 20 can be prevented from resonating with the motor 10. "Detune" used here involves shifting the natural frequency of the control case 20 from the frequency equal to the integral multiple (quadruple, octuple or the like) of the rotational frequency, whereupon the control case 20 can be prevented from resonating with the motor 10 and noise can be reduced to a large degree.

The vibration suppression structure includes the ribs 37 formed on the sides 35a and 35b of the case body 35 and the closing plate 40 closing the opening 38 of the case cover 36 and formed of the material differing from the material of the case cover 36. Accordingly, both vibration and noise suppression effects are achieved individually by the case body 35 and the case cover 36. Furthermore, since the opening 38 is formed so as to face the connecting terminal, cables can be connected through the opening 38 safely and easily.

The height and the thickness of each honeycomb rib 37 are set so as to be approximately 5% smaller or larger than the lengthwise dimension L2 of each one of sides 35a and 35b of control case 20. Accordingly, the stiffness of the control case 20 can be improved while the control case 20 is rendered as compact as possible with reduction of the height and thickness of each rib 37. More specifically, the control case 20 needs to ensure a cubic capacity thereof to accommodate various types of electronic components and the substrate 31. The above-described dimensions and the shape of the ribs 37 can reduce noise to a large degree and suppress vibration as much as possible as shown above as the results of analysis while suppressing increase in the size of the control case 20.

When the control case 20 is formed of a lightweight metal such as aluminum alloy as in the above-described embodiment, the control case 20 can shield radiated noise and can be rendered lightweight, whereupon the control case 20 can practically be rendered advantageous. Furthermore, since the control case 20 is mounted on the motor frame 18 (the motor 10) so as to be located radially outside the motor frame 18, the control case 20 is less subjected to the influences of vibration of the motor as compared with the case where the control case 20 is mounted on the motor frame 18 so as to be located axially outside the motor frame 18.

In a modified form, for example, the rotating electrical machine (the motor 10) should not be limited to the use with the pump unit 11. The rotating electrical machine may be applied as various types of drive motors also used as dynamo-electric generators.

The honeycomb shape should not be limited to a regular hexagon but may include substantially honeycomb shapes including the one having different ratios of vertical and horizontal dimensions as shown in FIG. 1. The sides of the control case 20 refer to four sides except for the side on which the control case 20 is mounted and the case cover located opposite the side on which the control case 20 is mounted. The ribs may only be formed on a part or all of the sides. The material of the vibration suppression structure of the control case 20 should not be limited to the aluminum alloy or stainless steel. The material may include a ferrous material and non-metal (synthetic resin material, for example).

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A rotating electrical machine having a stator and a rotor both accommodated in a frame, on which is mounted a control case to house a drive unit including an inverter, wherein the control case is provided with a vibration suppression structure that suppresses vibration of the control case, wherein the vibration suppression structure comprises honeycombed ribs formed integrally with a wall surface of the control case.

2. The machine according to claim 1, wherein the control case includes a first side only on which the ribs are formed and sides other than the first side, said sides being each formed with cooling fins.

3. The machine according to claim 1, wherein the ribs are formed so that the natural vibration frequency of the control case is detuned to thereby prevent the control case from resonating with the machine.

4. The machine according to claim 2, wherein the ribs are formed so that the natural vibration frequency of the control case is detuned to thereby prevent the control case from resonating with the machine.

5. The machine according to claim 1, wherein the control case includes a case body having an open side and a case cover which is provided so as to cover the open side of the case body and has an opening, and the vibration suppression structure includes the ribs formed on the first side of the case body and a closure which closes the opening of the case cover made of a material differing from a material of the case cover.

6. The machine according to claim 2, wherein the control case includes a case body having an open side and a case cover which is provided so as to cover the open side of the case body and has an opening, and the vibration suppression structure includes the ribs formed on the first side of the case body and a closure which closes the opening of the case cover made of a material differing from a material of the case cover.

7. The machine according to claim 3, wherein the control case includes a case body having an open side and a case cover which is provided so as to cover the open side of the case body and has an opening, and the vibration suppression structure includes the ribs formed on the first side of the case body and a closure which closes the opening of the case cover made of a material differing from a material of the case cover.

8. The machine according to claim 4, wherein the control case includes a case body having an open side and a case cover which is provided so as to cover the open side of the case body and has an opening, and the vibration suppression structure includes the ribs formed on the first side of the case body and a closure which closes the opening of the case cover made of a material differing from a material of the case cover.

9. The machine according to claim 1, wherein each rib has a thickness and a height both set so as to be approximately 5% smaller or larger than a lengthwise dimension of the first side of the control case.

10. The machine according to claim 2, wherein each rib has a thickness and a height both set so as to be approximately 5% smaller or larger than a lengthwise dimension of the first side of the control case.

11. The machine according to claim 3, wherein each rib has a thickness and a height both set so as to be approximately 5% smaller or larger than a lengthwise dimension of the first side of the control case.

12. The machine according to claim 4, wherein each rib has a thickness and a height both set so as to be approximately 5% smaller or larger than a lengthwise dimension of the first side of the control case.

13. The machine according to claim 5, wherein each rib has a thickness and a height both set so as to be approximately 5% smaller or larger than a lengthwise dimension of the first side of the control case.

14. The machine according to claim 6, wherein each rib has a thickness and a height both set so as to be approximately 5% smaller or larger than a lengthwise dimension of the first side of the control case.

15. The machine according to claim 7, wherein each rib has a thickness and a height both set so as to be approximately 5% smaller or larger than a lengthwise dimension of the first side of the control case.

16. The machine according to claim 8, wherein each rib has a thickness and a height both set so as to be approximately 5% smaller or larger than a lengthwise dimension of the first side of the control case.

* * * * *

UNITED STATES PATENT AND TRADEMARK OFFICE
CERTIFICATE OF CORRECTION

PATENT NO. : 8,853,896 B2
APPLICATION NO. : 13/646349
DATED : October 7, 2014
INVENTOR(S) : Yoshio Morisaki, Sueyoshi Mizuno and Shinichi Noda It is certified that error appears in the above-identified patent and that said Letters Patent is hereby corrected as shown below:

On The Title Page, Item (73) Assignee

Replace "Assignee: Kabushiki Kaisha Toshiba, Tokyo (JP)" with

--Assignees: Toshiba Industrial Products Manufacturing Corporation, Mie (JP) and Ebara Corporation, Tokyo (JP)--

Signed and Sealed this
Twenty-first Day of July, 2015

Michelle K. Lee
*Director of the United States Patent and Trademark Office*